United States Patent
Reboa, Jr.

(10) Patent No.: US 9,523,013 B2
(45) Date of Patent: Dec. 20, 2016

(54) NON-AQUEOUS MICROEMULSION INKJET INK

(71) Applicant: Hewlett-Packard Development Company, L.P., Fort Collins, CO (US)

(72) Inventor: Paul Felice Reboa, Jr., Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/443,795

(22) PCT Filed: Nov. 20, 2012

(86) PCT No.: PCT/US2012/066101
§ 371 (c)(1),
(2) Date: May 19, 2015

(87) PCT Pub. No.: WO2014/081418
PCT Pub. Date: May 30, 2014

(65) Prior Publication Data
US 2015/0284576 A1    Oct. 8, 2015

(51) Int. Cl.
| | | |
|---|---|---|
| *C09D 11/36* | (2014.01) |
| *C09D 11/023* | (2014.01) |
| *C09D 11/102* | (2014.01) |
| *C09D 11/328* | (2014.01) |

(52) U.S. Cl.
CPC .............. *C09D 11/36* (2013.01); *C09D 11/023* (2013.01); *C09D 11/102* (2013.01); *C09D 11/328* (2013.01)

(58) Field of Classification Search
CPC ...................................................... C09D 11/36
USPC ......................................................... 523/160
See application file for complete search history.

(56) References Cited

U.S. PATENT DOCUMENTS

| | | | |
|---|---|---|---|
| 4,864,006 A | 9/1989 | Giannetti et al. |
| 6,102,996 A * | 8/2000 | Parazak ................... | C09B 69/00 |
| | | | 106/31.25 |
| 6,429,258 B1 | 8/2002 | Morgan et al. |
| 6,696,512 B2 | 2/2004 | Poggio et al. |
| 2008/0196622 A1 | 8/2008 | Zhu |
| 2011/0012954 A1* | 1/2011 | Brown ..................... | C09D 11/36 |
| | | | 347/20 |
| 2011/0169901 A1 | 7/2011 | Pinto et al. |
| 2012/0016070 A1 | 1/2012 | Usugaya et al. |

FOREIGN PATENT DOCUMENTS

| | | |
|---|---|---|
| JP | 2002212466 | 7/2002 |
| JP | 2010189490 | 9/2010 |
| WO | 2008000680 | 1/2008 |
| WO | 2011073337 | 6/2011 |
| WO | 2012105950 | 8/2012 |
| WO | 2012121700 | 9/2012 |

OTHER PUBLICATIONS

International Search Report and Written Opinion dated May 15, 2013 for International Application No. PCT/US2012/066101 filed Nov. 20, 2012, Applicant Hewlett-Packard Development Company, L.P.

* cited by examiner

*Primary Examiner* — Doris Lee
(74) *Attorney, Agent, or Firm* — Thorpe, North & Western L.L.P.

(57) ABSTRACT

The present disclosure is drawn to a non-aqueous microemulsion inkjet ink comprising from 65 wt % to 95 wt % of a polar organic solvent system; from 0.1 wt % to 10 wt % of a colorant solids; from 0.2 wt % to 1 w % of a long-chained aliphatic capped perfluorinated ethoxylated polymer; and from 1 wt % to 7 wt % of a straight-chained or branched C4 to C12 non-polar solvent. The non-aqueous inkjet ink is in the form of a microemulsion with a continuous phase and a discontinuous phase, the continuous phase comprising the polar organic solvent system and the dye, and the discontinuous phase comprising the long-chained aliphatic capped perfluorinated ethoxylated polymer and the C4 to C12 non-polar solvent.

15 Claims, 2 Drawing Sheets

NON-AQUEOUS MICROEMULSION INKJET INK

BACKGROUND

The ink-jet printing industry uses different types of recording fluids such as oil-based inks, solvent-based (non-aqueous) inks, water-based inks, and solid inks (which are melted in preparation for dispensing). Solvent-based inks are fast drying, and as a result, are widely used for industrial and other types of printing. When solvent-based inks containing solvents, binders, colorants, and other ingredients are jetted onto a substrate, the solvent(s) partially or fully evaporate from the ink, leaving the colorant and other solids, e.g., binder or other solids, on the printed substrate. However, there are many types of these inks that could benefit from increased drop size for increased accuracy and more printing flexibility, as well as improved decap performance.

DETAILED DESCRIPTION

Figure 1:
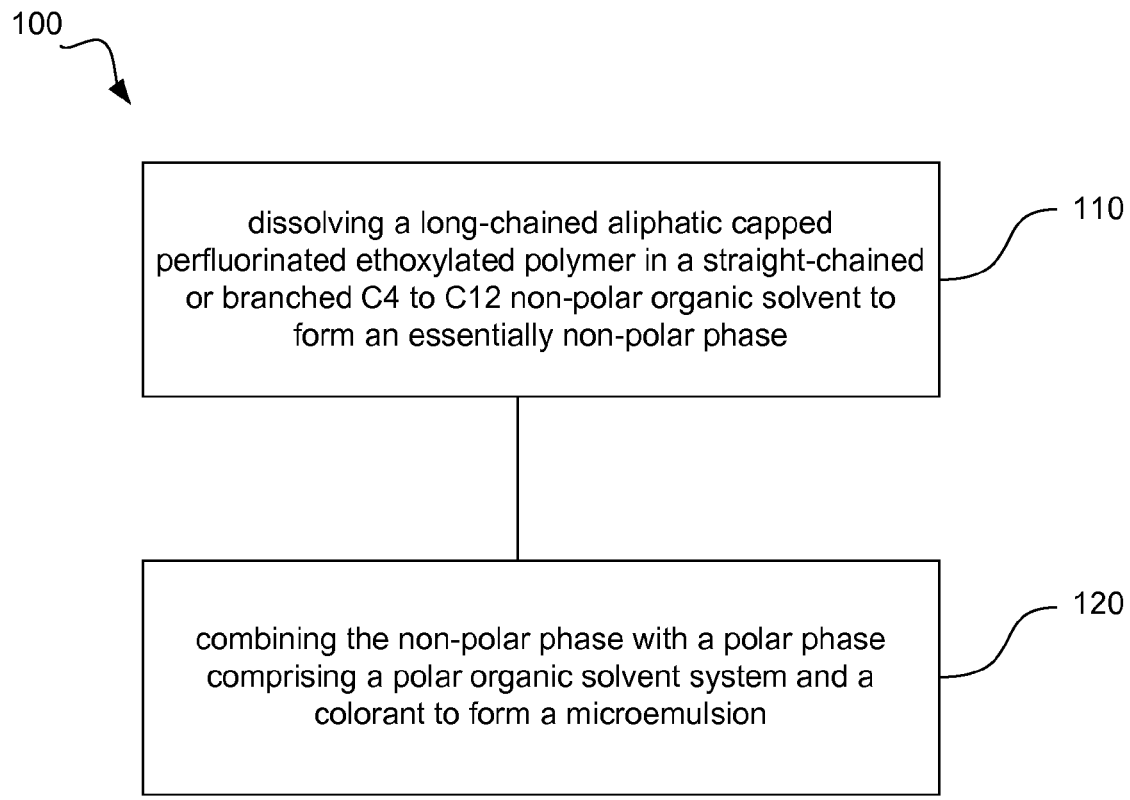
FIG. 1 sets forth a method of preparing a non-aqueous microemulsion inkjet ink.

Non-aqueous inkjet inks, or solvent-based inks generally, include non-aqueous liquid vehicle solvent systems, i.e. devoid of water, and a colorant, such as a pigment or a dye. With respect to certain non-aqueous inkjet ink formulations prepared in accordance with examples of the present disclosure, it has been recognized that there can be certain printing benefits related to the use of long-chained aliphatic capped perfluorinated ethoxylated polymers. This is because they act as a surfactant to improve print quality, and simultaneously, provide desirable decap performance, especially for a solvent-based ink inks. However, these long-chained aliphatic capped perfluorinated ethoxylated polymers are not readily dissolvable in many solvents, and are even poorly soluble in acetone/ethanol solvent mixtures, mostly due to the poor solubility of their long C14 to C24 aliphatic chains, e.g., stearyl (C18) chains, making it difficult to formulate acceptable inkjet ink formulations with this otherwise desirable polymer.

In accordance with this, it has been discovered that by the addition of non-polar organic solvent, such as C4 to C12 solvent(s), e.g., hexane, octane, etc., the long-chained aliphatic capped perfluorinated ethoxylated polymer can be more readily dissolved. Thus, when admixed with a polar organic solvent system, a microemulsion is formed that has many benefits. For example, it was surprising to discover that even though these long-chained aliphatic capped perfluorinated ethoxylated polymers are present primarily in a discontinuous non-polar phase of the microemulsion, they could still impart improved decap performance to the ink. Furthermore, by including these polymers primarily in the discontinuous (non-polar) phase, droplet size of the ink can be increased. For example, inks prepared without the non-polar organic solvent caused the polymer in the polar organic solvent system to form a micelle, and though the decap performance of these inks can also be good in these types of inks, the drop size/weight is typically lower, which has a negative impact on print quality, droplet directionality, etc. Furthermore, the use of a microemulsion as described increases substantially the solubility of the long-chained aliphatic capped perfluorinated ethoxylated polymers, simplifying processing and reducing costs.

In accordance with these advantages, the present disclosure is drawn to a non-aqueous microemulsion inkjet ink, comprising from 65 wt % to 95 wt % of a polar organic solvent system, from 0.1 wt % to 10 wt % of a colorant (e.g., dye or pigment based on colorant solids in the inkjet ink as a whole), from 0.2 wt % to 1 w % of a long-chained aliphatic capped perfluorinated ethoxylated polymer, and from 1 wt % to 7 wt % of a straight-chained or branched C4 to C12 non-polar solvent. The inkjet ink is in the form of a microemulsion with a continuous phase and a discontinuous phase, the continuous phase comprising the polar organic solvent system and the dye, and the discontinuous phase comprising the long-chained aliphatic capped perfluorinated ethoxylated polymer and the C4 to C12 non-polar organic solvent.

In another example, and in accordance with FIG. 1, a method 100 of preparing an inkjet ink can comprise dissolving 110 a long-chained aliphatic capped perfluorinated ethoxylated polymer in a straight-chained or branched C4 to C12 non-polar solvent to form an essentially non-polar phase. An additional step can include combining 120 the non-polar phase with a polar phase comprising a polar organic solvent system and a colorant to form a microemulsion. In one example, the polar phase can be combined with the non-polar phase by first admixing the polar organic solvent system with the non-polar phase, and then adding the colorant to the microemulsion. It is noted that the non-polar phase is referred to as an "essentially" non-polar phase. That is because the long-chained aliphatic capped perfluorinated ethoxylated polymer is not completely non-polar. The polar phase is comprised of the perfluorinated ethoxylate polymer that allows dissolution in the polar organic solvent(s) thus forming a microemulsion composed of an outer polar shell of the perfluorinated ethoxylated polymer with an inner non-polar shell of the C4 to C12 non-polar solvent with the long-chained aliphatic capped portion of the polymer. However, the "non-polar phase" is primarily non-polar by virtue of the C4 to C12 non-polar solvent(s) and the essentially non-polar long-chained aliphatic capped perfluorinated ethoxylated polymer.

In further detail regarding the method, any of the steps can be performed in a number of sequences and are not intended to be limited to the order written. Additionally, it is noted that any and all combinations of such steps or individual step may be performed sequentially or simultaneously. For example, the colorant can be added to the polar organic solvent system before admixture with the essentially non-polar phase. Alternatively, the colorant can be added last after the microemulsion is formed.

There are several processing advantages of preparing the inkjet inks of the present disclosure to form a microemulsion. First, this method eliminates the need for extensive processing of the long-chained aliphatic capped perfluorinated ethoxylated polymer. For example, in a more traditional system (not a microemulsion) that might include this polymer, a step of acid-washing the formulation with a solvent, such as acetic acid, to remove residual free stearyl amides (or other long aliphatic amides) may be needed. Additionally, a premix step where the higher molecular weight components of polymer are removed by separation in an acetone phase may also be desirable. Thus, both of these steps use and then remove solvent by stripping, which is not environmentally desirable, adds cost to the process, and adds processing time. Furthermore, the presence of unreacted stearyl (or other long chain alkyl) amide in the polar phase of the ink can reduce the shelf life of the ink. These residual free stearyl amides are less of a problem in the formulations of the present disclosure because they are protected within the discontinuous phase of the microemulsion. Thus, they do not necessarily need to be removed from the ink, nor do they lead to storage stability issues. Regarding storage stability, in more traditional systems that do not include the microemulsion structure of the present disclosure, when these long-chained aliphatic capped perfluorinated ethoxylated polymers are used, they tend to come out of solution when in cold storage (5° C. or less), leading to a warm up step of up to 24 hours to redissolve the polymer in the fluid reservoir before their full properties are restored. With the microemulsions of the present disclosure, typically, no long-chained aliphatic capped perfluorinated ethoxylated polymer comes out of solution, even after 24 hours at −20° C. This eliminates need for protective shipping and handling precautions, and leads to a more consistent user experience.

Another advantage of the microemulsion formulations of the present disclosure is that by structuring the formulation as a microemulsion as described herein, there is no need to dissolve the long-chained aliphatic capped perfluorinated ethoxylated polymer in the polar solvent. It can simply be included in the discontinuous phase with the non-polar solvent. Because the polymer does not need to be dissolved outside of this non-polar phase, there is no need to use acetone to dissolve the polymer (even though it can still be optionally used), and the polar organic solvent system can be formulated without acetone (a recognized drug-precursor). Thus, as acetone is not necessarily present in the inkjet inks of the present disclosure, a DfE variance (or other similar variance in another country) would not be needed in the United States.

In greater detail regarding the polymer itself, it is noted that long-chained aliphatic capped perfluorinated ethoxylated polymer does tend to form a micelle in the more typical polar liquid vehicles, forming micelles from 50 nm to 70 nm, for example. However, when admixing with the C4 to C12 non-polar solvent, once in the final inkjet ink formulation, the droplet size tends to be increased to around 200 nm, e.g., from 100 nm to 300 nm, effectively changing the structure from a normal micelle to a microemulsion. In this form, the formulation can keep both high and low molecular weight components in solution, allowing for a higher functioning ink without the need of the purification steps outlined previously.

The long-chained aliphatic capped perfluorinated ethoxylated polymer typically comprises a fluorinated ethoxy and methoxy polymer core that is end capped or terminated at both ends with a long chain C14 to C22 aliphatic amide (e.g., in the case of C18, it is a stearyl amide). With long aliphatic chains on either end, there can be a strong interaction between aliphatic tails. For example, stearyl (C18) chains interact with each other to reduce the repulsive forces from the polar solvent, leading to the formation of micelles. By utilizing a non-polar organic solvent admixed with the long-chained aliphatic capped perfluorinated ethoxylated polymer, a microemulsion can be formed that does not have these problems. Formula I shows the general structure of a long-chained aliphatic capped perfluorinated ethoxylated polymer that can be used, as follows:

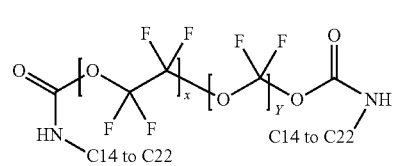

Formula I

Formula II below shows the general structure of a long-chained aliphatic capped perfluorinated ethoxylated polymer with stearyl amide end groups, as follows:

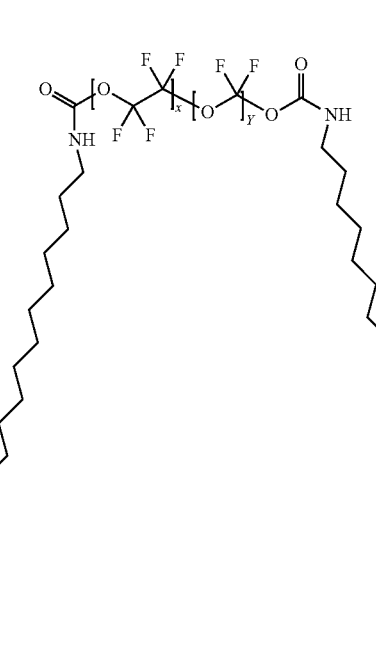

Formula II

In Formulas I and II, x can be from 1 to 16 and y can be from 1 to 27. Formula I sets forth an example where the alkyl amide endcaps are independently from C14 to C22, and Formula II sets forth a specific example where the endcaps are specifically stearyl amide chains (C18).

Regarding the straight-chained or branched C4 to C12 non-polar solvent(s), any non-polar organic solvent(s) can be used, provided it will readily admix with and more commonly dissolve the long-chained aliphatic capped perfluorinated ethoxylated polymer and form a discontinuous non-polar phase within the polar continuous phase provide by the polar organic solvent system. In one example, the non-polar solvent can be a straight-chained polar solvent, and in another example, the non-polar solvent can be a branched polar solvent. In still another example, the non-polar solvent can be an admixture of straight-chained and branched non-polar solvents. In one specific example, the non-polar solvent can be an admixture of hexane solvent isomers, and in another example, the non-polar solvent can be n-hexane. Alternatively, the non-polar solvent can be an admixture of octane solvent isomers, and in another example, the non-polar solvent can be n-octane, and so forth.

Turning to the polar organic solvent system, this system can comprise a single polar organic solvent, or can comprise multiple polar organic polar solvents. In one example, the polar organic solvent system can include acetone. In another example, the polar organic solvent system can be devoid of acetone. Alcohols, such as denatured alcohol, ethanol, propanol, butanol, etc., can also be used as one or more solvent in the polar organic solvent system. Mixtures of lower alcohols (C1 to C4) can also be used of any isomer. In one example, straight-chained propanol or butanol, for example, can be used alone or with ethanol. The solvent system can likewise include one or more solvent that is not a lower alcohol or acetone, such as glycol ether solvents, such as eEthylene Glycol Mono-butyl Ether (EGBE), Tripropylene glycol mono methyl ether, Propylene glycol methyl ether, Propylene glycol ethyl ether, Propylene glycol butyl ether, Dipropylene glycol mono methyl ether, Dipropylene glycol ethyl ether, Dipropylene glycol butyl ether, Propylene glycol n-propyl ether, Dipropylene glycol n-propyl ether, Tripropylene glycol n-propyl ether, Propylene glycol n-butyl ether, Dipropylene glycol n-butyl ether, Tripropylene glycol n-butyl ether, Dipropylene glycol dimethyl ether (Proglyme). Esters and Glycol ether acetate such as Propylene carbonate, Butyl glycolate, Propylene glycol methyl ether acetate, Ethyl Lactate, Butyl Lactate, N-Propyl S-Lactate and Ethylhexyl-S-Lactate, Dipropylene glycol methyl ether acetate, and Propylene glycol diacetate can also be used. Further, ketones such as Butyrolactone, Diiso butyl ketone, and Cyclohexanone can also be used. It is noteworthy that many of the above-listed solvents are included in the list of hazardous air polluting solvents released by the US Environmental Protection Agency (EPA). That being stated, any solvent that is functional in forming a microemulsion with the essentially non-polar phase can be used.

In addition to the polar organic solvent system, the inkjet ink composition also includes a colorant. Generally, the colorant discussed herein can include a pigment and/or dye. As used herein, "dye" refers to compounds or molecules that impart color to an ink vehicle. As such, dye includes molecules and compounds that reflect and those that absorb certain wavelengths of visible light. Generally, dyes are water soluble, but not always. In the present disclosure, as the inkjet inks prepared are non-aqueous ink, solubility or dispersability of the dye in the polar organic solvent system may be more applicable. Furthermore, as used herein, "pigment" generally includes pigment colorants, magnetic particles, aluminas, silicas, and/or other ceramics, organometallics or other opaque particles. In one example, the colorant can be a dye. In another example, the colorant can be present in the inkjet ink composition in an amount ranging from 0.1 wt % to 10 wt %, by solids, based on the weight of the inkjet ink composition as a whole. Typically, colorant is shipped in a liquid vehicle and the entire contents are included in the final inkjet ink composition. However, the weight percentage of the colorant is based on the colorant per se, and does not include the other liquid components that are used to dispend or dissolve the colorant for shipment or storage, etc.

Other additives can also be included in the inkjet ink compositions described herein. Non-limiting examples of other additives that can be used include polymeric binders, surfactants or wetting agents, slip components, dispersants, leveling agents, storage stability enhancing agents, and the like. Typical binders would include poly methyl methacrylate and functionalized poly methyl methacrylates, polyacrylates, acrylic copolymers, poly butyl methacrylates, nitrocellulose, ethyl cellulose, poly vinyl butarols, funtionalized rosins, amide and ketone functionalized rosins, styrene maleic anhydrides, and polyurethanes. The binders can be present at levels from 0.5 wt % to 5 wt %, for example. Viscosity modifiers may also be present, as well as other additives known to those skilled in the art to modify properties of the ink as desired. Such additives, if present, can be included at from 0.01 wt % to 20 wt %.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "solvent-based" or "non-aqueous" are used synonymously referring to inks that do not included water. If small amounts of water are present, such as because of an impurity or other reason where the total water content is present in a de minimis amount, e.g., less than 1 wt %, then the inkjet ink is still considered to be non-aqueous.

The term "system" when referring to a "solvent system" does not necessarily indicate that multiple materials are present. A single solvent can be a system. Often, however, multiple solvents are present in a "system."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate the embodiments of the invention that are presently best known. However, it is to be understood that the following are only exemplary or illustrative of the application of the principles of the present disclosure. Numerous modifications and alternative compositions and methods may be devised by those skilled in the art without departing from the spirit and scope of the present disclosure. The appended claims are intended to cover such modifications and arrangements. Thus, while the present disclosure has been described above with particularity, the following examples provide further detail in connection with what are presently deemed to be practical embodiments.

Example 1

Drop Weight and Drop Volume

Three formulations were prepared to evaluate drop size differences for inks prepared in accordance with examples of the present disclosure (microemulsions in Tables 1A and 1B) compared to a similar ink prepared with the same long-chained aliphatic capped perfluorinated ethoxylated polymer (Fluorolink A10P), but without the discontinuous phase generated by inclusion of hexane in the formulation (micelle ink formulation of Table 1C), as follows:

TABLE 1A

Acetone/Ethanol Microemulsion Ink (Ink 1A)

| Components | Wt % |
|---|---|
| Fluorolink A10P | 0.6 (as received) |
| Hexanes (mixture of isomers) | 3 |
| Acetone | 6 |
| Denatured Ethanol | 71.4 |
| Morfast Brown 100 | 19 (about 50 wt % solids) |
| Total | 100 |

TABLE 1B

Ethanol Microemulsion Ink (Ink 1B)

| Components | Wt % |
|---|---|
| Fluorolink A10P | 0.6 (as received) |
| Hexanes (mixture of isomers) | 3 |
| Denatured Ethanol | 77.4 |
| Morfast Brown 100 | 19 (about 50 wt % dye) |
| Total | 100 |

TABLE 1C

Comparative Micelle Ink (Ink 1C)

| Components | Wt % |
|---|---|
| Fluorolink A10P | 0.6 (as received) |
| Acetone | 6 |
| Denatured Ethanol | 74.4 |
| Morfast Brown 100 | 19 (about 50 wt % solids) |
| Total | 100 |

Drop weight and drop volume analysis was performed on the inks set forth in Tables 1A to 1C. These inks were printed from a thermal inkjet printer at 10.5V and 1.6 μs pulse width with no pre-warming pulse. The results are shown in Table 1 D, as follows:

TABLE 1D

Drop Weight and Drop Volume Comparison

| Sample ID | Drop Weight | Drop Volume |
|---|---|---|
| Ink 1A | 12.2 ng (±1.0) | 14.9 pL (±1.2) |
| Ink 1B | 11.5 ng (±1.0) | 14.0 pL (±1.2) |
| Ink 1C | 9.5 ng (±1.0) | 11.6 pL (±1.2) |

As can be seen in Table 1D, Ink 1A has about 28% more drop weight than Ink 1C. Likewise, Ink 1B has about 21% more drop weight than Ink 1C. Similar drop volume increases were also achieved when comparing Inks 1A and 1B to Ink 1C. It is notable that the drop weight/volume increase of Ink 1A is larger than the drop weight/volume increase of Ink 1B, perhaps because the acetone helps solubilize the dye to a greater degree than in the formulation without the acetone. That being stated, there are advantages in providing inks without acetone for environmental reasons, as previously described herein. Thus, obtaining a large improvement in drop size for Ink 1B over an ink that included acetone (Ink 1C) was unexpected.

Larger droplet sizes provide many benefits in inkjet printing technologies, particularly when printing accuracy is highly desirable, e.g., printing bar codes, etc. For example, larger drop sizes generally help improve ink droplet directionality and increases the allowable distance between the printhead and the media surface. This is partly because larger droplets provide more momentum, and thus, carry further more accurately. For example, with the larger droplet sizes as shown in Table 1D for the microemulsion inks compared to the micelle type ink, as much as double the distance between the printhead and the media surface can be realized compared to the smaller drop size provided by the micelle-type ink (Ink 1C).

With specific reference to the scale up of Ink 1B (no acetone), it was thought that a small amount of heat might need to be used to dissolve the Fluorolink in the Hexane, e.g., place container into 40° C. bath while stirring to help dissolve the Fluorolink more quickly. However, it turned out that no heat was needed after all, as dissolution occurred within a minute or two after starting to mix the components. Once the polymer was dissolved in the non-polar solvent, the hexane/Fluorolink mixture can be added to the polar organic solvent system and stirred for about 1 hour, followed by degassing, filter, and inkjet pen filling.

Example 2

Decap Performance

Two inks were prepared in accordance with the general formulation principles of Ink 1B above, i.e. dye-based ink microemulsion with hexane and no added acetone. In this study, various types of alcohols were used for the polar organic solvent system to determine which performed better with respect to decap performance. Formulations 2A and 2B (both of which exhibit the improved drop weight/volume described in Example 1) are set forth below:

TABLE 2A

Microemulsion Ink with Isopropanol Polar Organic Solvent System (Ink 2A)

| Components | Wt % |
|---|---|
| Fluorolink A10-P | 0.3 (as received) |
| Hexanes (mixture of isomers) | 3 |
| Cyclohexanone | 6 |
| Isopropyl alcohol (IPA) | 83.78 |
| Binder | 0.92 |
| Orasol Black X55 | 5 |
| Orasol Orange 247 | 1 |
| Total | 100 |

TABLE 2B

Microemulsion Ink with n-Propanol and Ethanol Polar Organic Solvent System (Ink 2B)

| Components | Wt % |
|---|---|
| Fluorolink A10-P | 0.3 (as received) |
| Hexanes (mixture of isomers) | 3 |
| Cyclohexanone | 6 |
| Denatured Ethanol | 41.89 |
| n-Propanol | 41.89 |
| Binder | 0.92 |
| Orasol Black X55 | 5 |
| Orasol Orange 247 | 1 |
| Total | 100 |

Each of the inks of this example, Ink 2A and Ink 2B, were printed on a media substrate to determine the decap performance of each of the inks. The testing protocol included printing blackout boxes initially to verify that all printhead nozzles were firing properly. Then, a predetermined time interval (10 seconds, 60 seconds, or 5 minutes) was allowed to pass where nothing occurred, i.e. the printer sits dormant. After this predetermined period of time, lines are printed based from specific sets of nozzles in order to generate a straight line. Those nozzles are fired continuously at 600 dots per inch and 30 inches/second. All printing is from left to right. Thus, at the left side, there are may be misfiring that start out misfiring but get corrected over time as the printhead moves to the right. Good decap performance would be indicated when the first firing (left-most portion of line) prints properly. If there is a horizontal line missing, it means there is a nozzle out (not functioning).

Figure 2:
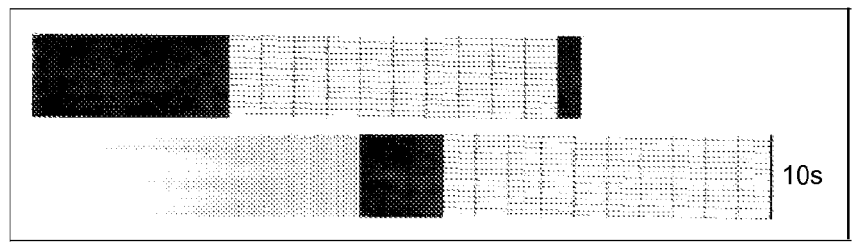
FIG. 2 provides decap performance printing results for a specific inkjet ink prepared in accordance with examples of the present disclosure.
Figure 3:
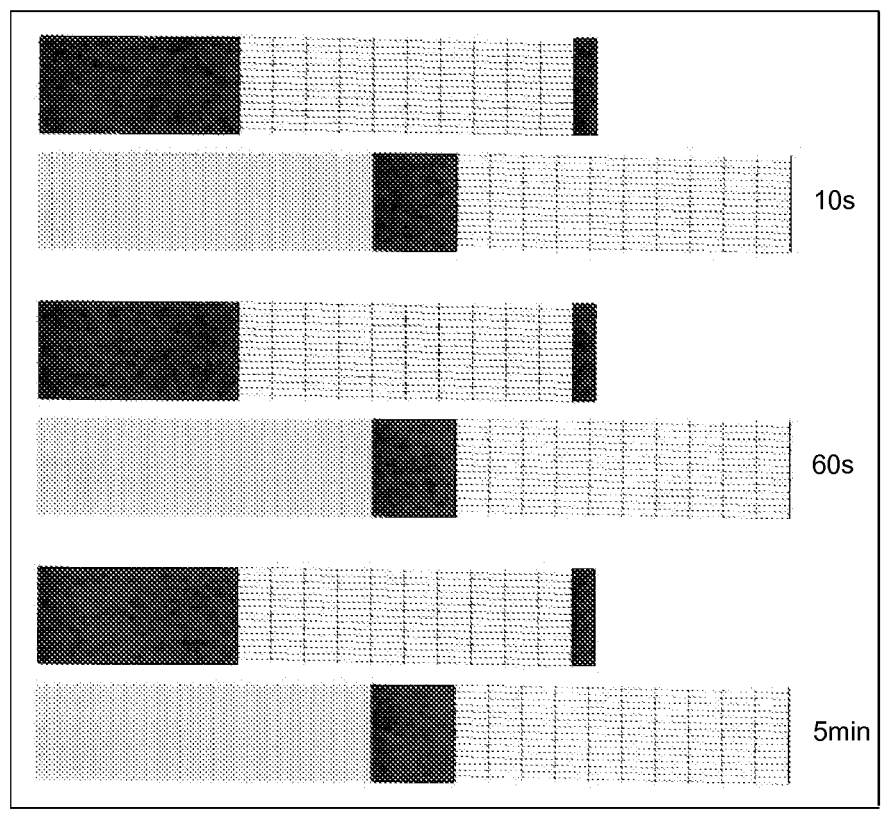
FIG. 3 provides decap performance printing results for an alternative specific inkjet ink prepared in accordance with examples of the present disclosure.

FIGS. 2 and 3 provide the printing results from this evaluation. FIG. 2 shows the results from Ink 2A, and FIG. 3 shows the results from Ink 2B. Each printing test begins with a printed control sample 210 to verify that everything was working correctly. The lower printed sample was the printed test sample 220, which provides the actual decap performance information set forth and described above. As can be seen, FIG. 2 provides an example of poor decap, and FIG. 3 provides an example of excellent decap performance, even with a 5 minute time interval where the printer stood dormant. More specifically, with respect to FIG. 2, it can be seen that the inkjet pen had a hard time printing and required over 50 drops to be able to fully recover. It is believed that the substitution of ethanol (Ink 2B) with isopropyl alcohol (Ink 2A) decreases the diffusivity of the Fluorolink A10-P and results in poor decap (evaporation and plugging of nozzles). It is notable that the decap performance actually improved (not shown) at 300 seconds as the Fluorolink had enough time to migrate to surface and block further evaporation.

Example 3

Non-Polar Organic Solvent Concentrations

Various concentrations of non-polar solvent were evaluated to assess the relative concentrations and ratios of various components. In this example, no dyes were included so that the vehicle component could be evaluated in isolation without the added color. However, any of these ink vehicles can be formulated with from 0.1 wt % to 10 wt % of colorant solids, as described herein. Specifically, in these ink vehicles, the presence of from 0 to 7 wt % of hexanes was evaluated, as shown in Tables 3A to 3F below.

TABLE 3A

Microemulsion Ink Vehicle (Ink Vehicle 3A)

| Components | Wt % |
|---|---|
| SDA40-200 | 90.86 |
| Acetone | 7.40 |
| Hexanes | 1.00 |
| Fluorolink A10-P | 0.74 |
| Total | 100.00 |

TABLE 3B

Microemulsion Ink Vehicle (Ink Vehicle 3B)

| Components | Wt % |
|---|---|
| SDA40-200 | 89.86 |
| Acetone | 7.40 |
| Hexanes | 2.00 |
| Fluorolink A10-P | 0.74 |
| Total | 100.00 |

TABLE 3C

Microemulsion Ink Vehicle (Ink Vehicle 3C)

| Components | Wt % |
|---|---|
| SDA40-200 | 88.86 |
| Acetone | 7.40 |
| Hexanes | 3.00 |
| Fluorolink A10-P | 0.74 |
| Total | 100.00 |

TABLE 3D

Microemulsion Ink Vehicle (Ink Vehicle 3D)

| Components | Wt % |
|---|---|
| SDA40-200 | 86.86 |
| Acetone | 7.40 |
| Hexanes | 5.00 |
| Fluorolink A10-P | 0.74 |
| Total | 100.00 |

TABLE 3E

Microemulsion Ink Vehicle (Ink Vehicle 3E)

| Components | Wt % |
|---|---|
| SDA40-200 | 84.86 |
| Acetone | 7.40 |
| Hexanes | 7.00 |
| Fluorolink A10-P | 0.74 |
| Total | 100.00 |

TABLE 3F

Comparative Micelle Ink Vehicle (Ink Vehicle 3F)

| Components | Wt % |
| --- | --- |
| SDA40-200 | 91.86 |
| Acetone | 7.40 |
| Hexanes | — |
| Fluorolink A10-P | 0.74 |
| Total | 100.00 |

In each of these ink vehicles (no dye), the Fluorolink dissolved quickly, e.g., within a couple of minutes, except for Ink Vehicle 3F which had no hexanes present. Regarding Inks 3A to 3E, each of the solutions had a slight haze and a bluish tinge. An increase in particle size (discontinuous phase) for these inks was also observed, ranging from about 230 nm to 270 nm, with a small portion at 600 nm. The solutions appeared to be microemulsions in their character. Each of these ink vehicles (Ink Vehicles 3A to 3E, with hexanes present) were stored at −20° C. overnight, and only small amount of solids at bottom in Ink Vehicle A and Ink Vehicle B was noticed to have developed (more so with Ink Vehicle A). All others did not show any precipitate. Inks made from these ink vehicles seem to print well with a decap performance of at least 5 minutes.

Example 4

Exemplary Formulations and Methods

For exemplary purposes, several other microemulsion inks (other than those described above in Examples 1-3) were prepared. However, it is noted that the same methodology was used for these microemulsion inks as was used to prepare the microemulsion inks above. In short, these inks were prepared by admixing the long-chained aliphatic capped perfluorinated ethoxylated polymer with the non-polar organic solvent (typically dissolving the polymer in the non-polar organic solvent). The microemulsion was then formed by admixing this with the polar organic solvent system. Dye was added thereafter, though it could likewise be added prior to forming the microemulsion. Specifically, Inks 4A-4D are exemplified in Tables 4A to 4D, as follows:

TABLE 4A

Ethanol Microemulsion Ink (Ink 4A)

| Components | Wt % |
| --- | --- |
| Fluorolink A10P | 0.6 (as received) |
| n-Hexane | 3 |
| Denatured Ethanol | 77.4 |
| Morfast Brown 100 | 19 (about 50 wt % solids) |
| Total | 100 |

TABLE 4B

Ethanol Microemulsion Ink (Ink 4B)

| Components | Wt % |
| --- | --- |
| Fluorolink A10P | 0.6 (as received) |
| n-Octane | 3 |
| Denatured Ethanol | 76.6 |
| Binder | 0.8 |

TABLE 4B-continued

Ethanol Microemulsion Ink (Ink 4B)

| Components | Wt % |
| --- | --- |
| Morfast Brown 100 | 19 (about 50 wt % dye) |
| Total | 100 |

TABLE 4C

Acetone/Ethanol Microemulsion Ink (Ink 4C)

| Components | Wt % |
| --- | --- |
| Fluorolink A10P | 0.3 (as received) |
| Hexanes (mixture of isomers) | 3 |
| Cyclohexanone | 9 |
| Acetone | 6 |
| Denatured Ethanol | 72.7 |
| Binder | 3 |
| Orasol Black X55 | 5 |
| Orasol Orange 247 | 1 |
| Total | 100 |

TABLE 4D

Ethanol Microemulsion Ink (Ink 4D)

| Components | Wt % |
| --- | --- |
| Fluorolink A10P | 0.3 (as received) |
| Hexanes (mixture of isomers) | 5 |
| Denatured Ethanol | 85.7 |
| Binder | 3 |
| Orasol Black X55 | 5 |
| Orasol Orange 247 | 1 |
| Total | 100 |

Note that Ink 4D is essentially the same as Ink 4C, except without the cyclohexanone or acetone. This is provided to illustrate that the preparing of microemulsion allows for the removal of these ketones without a substantial change in performance.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A non-aqueous microemulsion inkjet ink, comprising:
    from 65 wt % to 95 wt % of a polar organic solvent system;
    from 0.1 wt % to 10 wt % of a colorant;
    from 0.2 wt % to 1 w % of a long-chained aliphatic capped perfluorinated ethoxylated polymer; and
    from 1 wt % to 7 wt % of a straight-chained or branched C4 to C12 non-polar organic solvent,
    wherein the non-aqueous inkjet ink is in the form of a microemulsion with a continuous phase and a discontinuous phase, the continuous phase comprising the polar organic solvent system and the colorant, and the discontinuous phase comprising the long-chained aliphatic capped perfluorinated ethoxylated polymer and the C4 to C12 non-polar solvent.

2. The non-aqueous microemulsion inkjet ink of claim 1, wherein the polar organic solvent system comprises acetone, a C2 to C4 alcohol, or mixture thereof.

3. The non-aqueous microemulsion inkjet ink of claim 1, wherein the polar organic solvent system is present at from 70 wt % to 85 wt %.

4. The non-aqueous microemulsion inkjet ink of claim 1, wherein the colorant is a dye.

5. The non-aqueous microemulsion inkjet ink of claim 1, wherein the non-polar organic solvent comprise a hexane or an octane solvent.

6. The non-aqueous microemulsion inkjet ink of claim 1, wherein the weight ratio of non-polar solvent to long-chained aliphatic capped perfluorinated ethoxylated polymer is form 1:1 to 20:1.

7. The non-aqueous microemulsion inkjet ink of claim 1, further comprising from 0.5 wt % to 5 wt % of a polymeric binder.

8. The non-aqueous microemulsion inkjet ink of claim 1, wherein the polar organic solvent system comprises a C2 to C4 alcohol and is devoid of ketones.

9. The non-aqueous microemulsion inkjet ink of claim 8, wherein the C2 to C4 alcohol is substantially devoid of branched alcohols.

10. The non-aqueous microemulsion inkjet ink of claim 1, wherein the long-chained aliphatic capped perfluorinated ethoxylated polymer has the following structure:

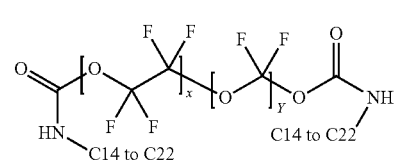

Formula I where x is from 1 to 16 and y is from 1 to 27.

11. The non-aqueous microemulsion inkjet ink of claim 10, wherein both of the C14 to C22 alkyl chains are C18 (stearyl).

12. A method of preparing a non-aqueous microemulsion inkjet ink, comprising:
   dissolving a long-chained aliphatic capped perfluorinated ethoxylated polymer in a straight-chained or branched C4 to C12 non-polar organic solvent to form an essentially non-polar phase; and
   combining the non-polar phase with a polar phase comprising a polar organic solvent system and a colorant to form a microemulsion.

13. The method of claim 12, wherein the colorant is a dye.

14. The method of claim 12, wherein the polar phase is combined with the non-polar phase by first admixing the polar phase with the non-polar phase, and then adding the colorant to the microemulsion.

15. The method of claim 12, wherein the weight ratio of non-polar solvent to long-chained aliphatic capped perfluorinated ethoxylated polymer is form 1:1 to 20:1.

* * * * *

UNITED STATES PATENT AND TRADEMARK OFFICE
CERTIFICATE OF CORRECTION

PATENT NO. : 9,523,013 B2  
APPLICATION NO. : 14/443795  
DATED : December 20, 2016  
INVENTOR(S) : Paul Felice Reboa Page 1 of 1

It is certified that error appears in the above-identified patent and that said Letters Patent is hereby corrected as shown below:

On the Title Page

Item (12) should read --Reboa--

Item (72) "Paul Felice Reboa, Jr." should read --Paul Felice Reboa--

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*